United States Patent [19]

Blasing et al.

[11] Patent Number: 4,458,062

[45] Date of Patent: Jul. 3, 1984

[54] CONTINUOUSLY PRODUCED MELT REACTED MELAMINE-FORMALDEHYDE RESINS

[75] Inventors: Elmer P. Blasing; Ronald J. Keeling; Jin-Young K. Roe, all of Cincinnati, Ohio

[73] Assignee: American Cyanamid Company, Stamford, Conn.

[21] Appl. No.: 466,172

[22] Filed: Feb. 14, 1983

[51] Int. Cl.$^3$ ............................................. C08G 12/32
[52] U.S. Cl. ................................... 528/254; 156/285; 528/230
[58] Field of Search ................................ 528/230, 254

[56] References Cited

U.S. PATENT DOCUMENTS

| | | | |
|---|---|---|---|
| 3,394,093 | 7/1968 | Salem | 528/254 X |
| 4,039,493 | 8/1977 | Schön et al. | 528/254 X |
| 4,081,426 | 3/1978 | Michel et al. | 528/254 |
| 4,168,370 | 9/1979 | Ogden et al. | 528/254 X |

Primary Examiner—Lucille M. Phynes
Attorney, Agent, or Firm—Frank M. Van Riet

[57] ABSTRACT

A method for producing a melamine-formaldehyde resin by reacting crystalline melamine and solid formaldehyde in a single pass reactor, the resin produced by said process and a reinforcing substrate coated with said melamine-formaldehyde resin, are disclosed.

4 Claims, No Drawings

CONTINUOUSLY PRODUCED MELT REACTED MELAMINE-FORMALDEHYDE RESINS

BACKGROUND OF THE INVENTION

Amino resins, e.g. melamine-formaldehyde resins have been known and used commercially for over half a century. Melamine-formaldehyde resins have historically been prepared in aqueous solution in a single stage, batch reaction. Although a majority of the melamine-formaldehyde resins now commercially available are produced using batch reactions, continuously produced resin is known. The commercial production of continuously produced resin however, requires cascade feeding through a series of stirred tank reactors or reaction on a rubber mill, both procedures requiring extended periods of time.

SUMMARY OF THE INVENTION

It has now been found that melamine-formaldehyde resins can be produced continuously utilizing short periods of reaction so as to result in energy and labor savings. The resins are produced as 90-100% solid materials in the substantial absence of water or any other solvent. The process of the present invention results in the production of melamine-formaldehyde resins which exhibit properties materially different than prior art solution produced resins when coated on reinforcing substrates. The instant process is very rapid as compared to known batch procedures and results in resins which can be cooled and ground into powder or coated onto reinforcing substrates while still molten. Utilizing the aqueous batch procedures of the prior art, in order to achieve a powdered resin, the liquid resin produced must first be subjected to a drying step such as spray-drying. Furthermore, if the resin solution produced is used to saturate paper sheets in the manner normally followed for the production of laminated articles, energy must be employed to evaporate the solvent from the sheet after impregnation. Additionally, coreactants and modifiers cannot be added to resin solutions unless they are co-solvable in the solvent employed.

The instant process allows the incorporation into the melamine-formaldehyde resin of the necessary or desired co-reactants and modifiers during the resin formation. Furthermore, the resins formed can be coated directly onto reinforcing substrates for ultimate laminate production immediately upon recovery from the reactor as molten materials.

DESCRIPTION OF THE INVENTION INCLUDING PREFERRED EMBODIMENTS

The present invention comprises a continuous method for the one-shot preparation of a melamine-formaldehyde resin comprising:

(a) charging crystalline melamine and solid formaldehyde in the absence of solvent and at a ratio of formaldehyde to melamine ranging from about 1:1 to about 3:1, respectively, into a single pass continuous reactor at a temperature ranging from about 120° C. to about 180° C. for from about 30 seconds to about 5 minutes and (b) recovering the resultant resin as a molten material.

This process enables the manufacture of melamine-formaldehyde resins utilizing a continuous process and substantially solvent-free media. The process comprises either blending the reactants, and any coreactants or other modifiers, together and then subjecting them to reaction in a continuous reactor or feeding each component into the reactor individually. The crystalline melamine and solid formaldehyde, when blended, form an essentially 100% reactive composition. They may be blended together in any suitable manner such as by the use of a mixer or other device which insures the formation of a homogeneous distribution thereof. Examples of coreactants include triethanolamine, hydroxypropyl melamine, 1,4-butanediol etc. and examples of modifiers include any thermoplastic material melting within the above range of reaction temperatures, for example, low molecular weight, low density polyethylene, low-melting polyamides, biscarbamates and the like. Other useful modifiers include fibers, pigments, abrasives, microbubbles, stabilizers, absorbers, dyes and the like.

The reactive components in the form of the resultant homogeneous blend or individual charges are fed into a continuously stirred, single-pass reactor such as a single-screw extruder, a twin-screw extruder, a kneader extruder, a series of Moyno pumps, a great extruder i.e. any reactor that transports a reaction product of increasing viscosity, at temperatures substantially higher than those used to produce resins via a batch reaction and for residence times of only a fraction of the normal batch systems. In accordance with the instant invention, temperatures ranging from about 120° C. to about 180°, preferably from about 125° C. to about 155° C. and reaction times of from about 30 seconds to about 5 minutes, preferably from about 2 minutes to about 3 minutes, are employed. Under these conditions, an addition reaction between the melamine and the formaldehyde is achieved with a minimum of any condensation reaction occurring. Depending upon the specific conditions employed, the reaction can be controlled so as to recover a resin of any desired melt viscosity, a possibility not achievable using known solution technology.

The novel resins resulting from the process of the present invention may be recovered from the reactor as a liquid melt or, alternatively, as a solid. They are, as mentioned above, addition reaction resins and are solid at room temperature. Upon exiting from the reactor, they are of high solids and contain small amounts of water i.e. 2-8%, and usually some unreacted charge materials. They are normally 95-100% resin and in a molten state.

Upon recovery from the exit end of the one-pass reactor, the melamine-formaldehyde resins can be cooled to room temperature in any manner and ground to powdery form utilizing known granulating equipment.

Alternatively, the resins which exit the reactor can be spread, while molten, onto a substrate e.g. paper, such as kraft paper, α-cellulose containing paper etc., non-woven webs, cloth, glass and the like. The resultant novel coated substrates can then be cooled and stored and/or used in any desired manner such as for the production of low or high pressure laminates. In the case of paper substrates, the resultant coated paper is not brittle and can be rolled, a feature contrary to paper which is treated with aqueous solutions of melamine formaldehyde resins produced via batch procedures and then dried. While not wishing to be bound by any particular theory as to why such coated paper sheets are flexible, it is believed that the high solids and low water content of the resins produced by the instant process enables them to be coated onto the paper without destroying the hydrogen bonding of the paper or causing cellulose swelling and resin penetration which usually accompanies solution impregnation thereof.

The following examples are set forth for purposes of illustration only and are not to be construed as limitations on the present invention except as set forth in the appended claims. All parts and percentages are by weight unless otherwise specified.

EXAMPLE 1

Two moles of flake paraformaldehyde, one mole of melamine crystals and 0.05 mole of triethanolamine are blended together in a suitable mixer to form a uniform mixture thereof. This mixture is then fed into a one-pass, single screw extruder operating at a 130° C. barrel temperature and a screw speed controlled to result in a product residence time in the reactor of approximately three minutes. The resultant resin is discharged from the reactor and then cooled to a solid mass. It is then mechanically ground. The powdered resin is dissolved in an alcohol-water solution. The solution is then used to impregnate an α-cellulose containing decor sheet, which sheet is then dried and heat and pressure consolidated into a decorative laminate, using conventional phenolic resin impregnated kraft sheets as the core, which passes all NEMA specifications.

EXAMPLE 2

To a suitable blending apparatus are added and blended 1.6 moles of solid paraformaldehyde, 1.0 mole of crystalline melamine, 0.07 mole of 1,4-butanediol, 0.04 mole of triethanolamine and 0.08 mole of hydroxypropylmelamine. The resultant blend is processed using a continuous, one-shot, one-pass, single screw reactor operating at 150° C. and a residence time of $1\frac{3}{4}$ minutes. The hot discharge is immediately coated onto α-cellulose containing decor paper and solidified by cooling to room temperature. When the paper sheet is employed as a component in a high pressure decorative laminate assembly as in Example 1 and heat and pressure consolidated, an excellent decorative laminate results.

EXAMPLE 3

The procedure of Example 2 is again followed except that about 10% of the total ingredients added to the mixing apparatus includes titanium dioxide powder. The blended materials are fed through the extruder at 130° C. with a residence time of two minutes and the continuous discharge stream is then cooled. The solidified product is broken into lumps and further ground to a fine white powder. The powder is then mixed with purified wood fibers, air-laid onto a foraminous belt and molded into a solid reinforced sheet.

EXAMPLE 4

The procedure of Example 3 is again followed except that the hot continuous discharge is immediately coated onto a sheet of 60 -cellulose containing paper and cooled. The resultant sheet is used as the decor sheet in a high pressure laminate assembly as in Example 1 and heat and pressure consolidated into an excellent white decorative laminate.

EXAMPLE 5

The procedure of Example 3 is again followed except that glass microballoons are added to the mixer and processed through the extruder. The resultant composition is then cast into $\frac{1}{2}"$ thick slabs and formed into bathroom sinktops.

EXAMPLE 6

The procedure of Example 3 is again followed except that a commercially available thermoplastic acrylic resin is admixed with the ingredients before extrusion. A moldable product is recovered.

EXAMPLE 7

The procedure of Example 4 is again followed except that the hot continuous discharge is coated in a nip between the raw α-cellulose containing paper and a texturizing release sheet. The resultant paper assembly is used in the manufacture of a high pressure decorative laminate between a phenolic resin impregnated kraft paper core assembly and a polished press plate. An excellent laminate is recovered.

EXAMPLE 8

The procedure of Example 7 is again followed except that the texturing release sheet is replaced by an endless release belt. When the paper resulting from this coating is used as the decor sheet in the production of a low pressure laminate on particleboard, an excellent laminate results.

EXAMPLE 9

The procedure of Example 7 is again followed except that the endless belt is replaced by an overlay sheet. The resultant overlay-decor composite is then used as the top layer of a high pressure decorative laminate, the overlay sheet comprising the topmost layer. A decorative laminate passing all NEMA standards is recovered.

EXAMPLE 10

The procedure of Example 1 is again followed except that a twin-screw extruder is used. Substantially equivalent results are observed.

EXAMPLE 11

The use of a kneader extruder in lieu of the extruder of Example 1 results in the production of an excellent resinous product.

EXAMPLE 12

The procedure of Example 7 is again followed except that the heat continuous discharge is coated in a nip between the raw α-cellulose containing paper and a decor sheet. An excellent laminate is formed.

We claim:

1. A continuous method for the one-shot preparation of a melamine-formaldehyde resin which comprises:
charging crystalline melamine and solid formaldehyde, in the absence of solvent, into a single pass reactor at a temperature ranging from about 120° C. to about 180° C. for from about 30 seconds to about 5 minutes and recovering the resultant resin as a molten liquid.

2. The method of claim 1 wherein the resultant liquid resin is cooled and ground into a powder.

3. The method of claim 1 wherein said melamine and said formaldehyde are homogeneously admixed before charging to said reactor.

4. The melamine-formaldehyde resin produced by the process of claim 1.

* * * * *